Jan. 19, 1943.　　　W. E. INGERSON　　　2,308,606
METHOD OF MAKING SOLDER CONNECTIONS
Filed May 8, 1941　　　7 Sheets-Sheet 1
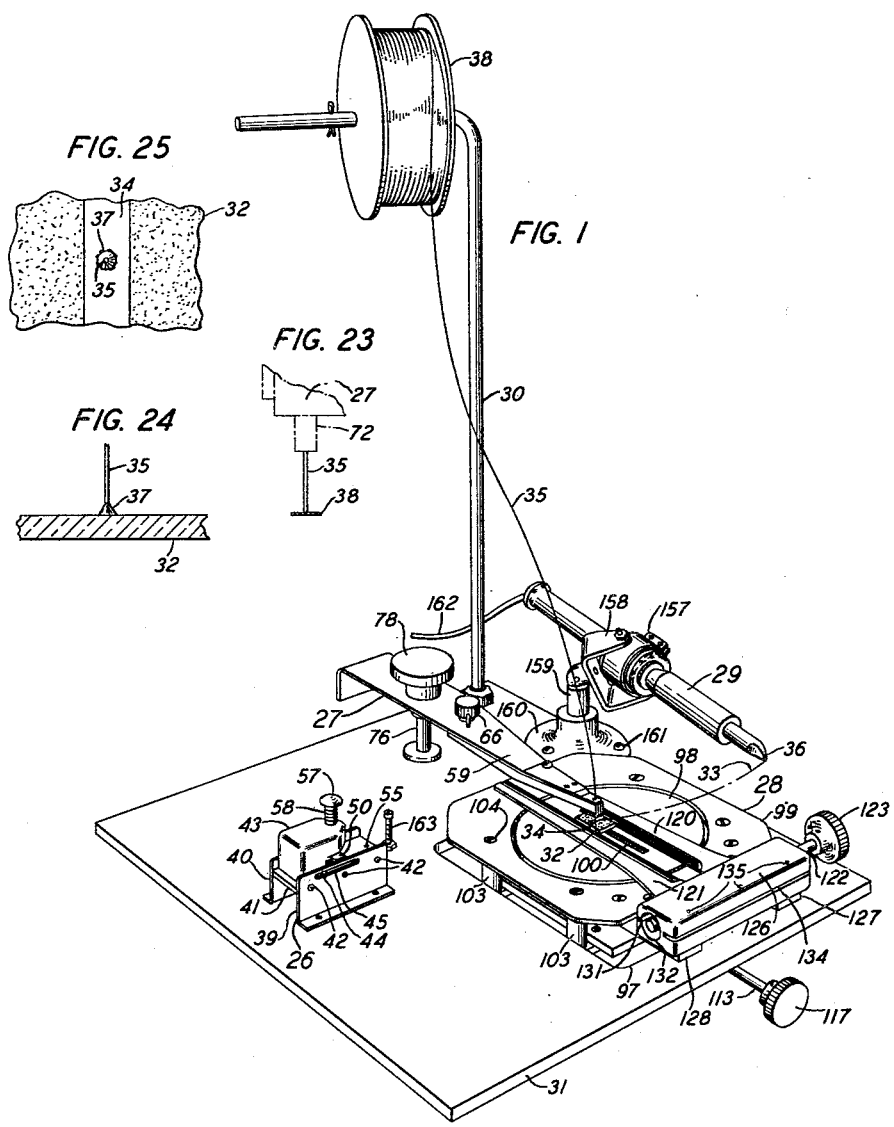
INVENTOR
W. E. INGERSON
BY J. MacDonald
ATTORNEY Jan. 19, 1943.  W. E. INGERSON  2,308,606
METHOD OF MAKING SOLDER CONNECTIONS
Filed May 8, 1941 7 Sheets-Sheet 2
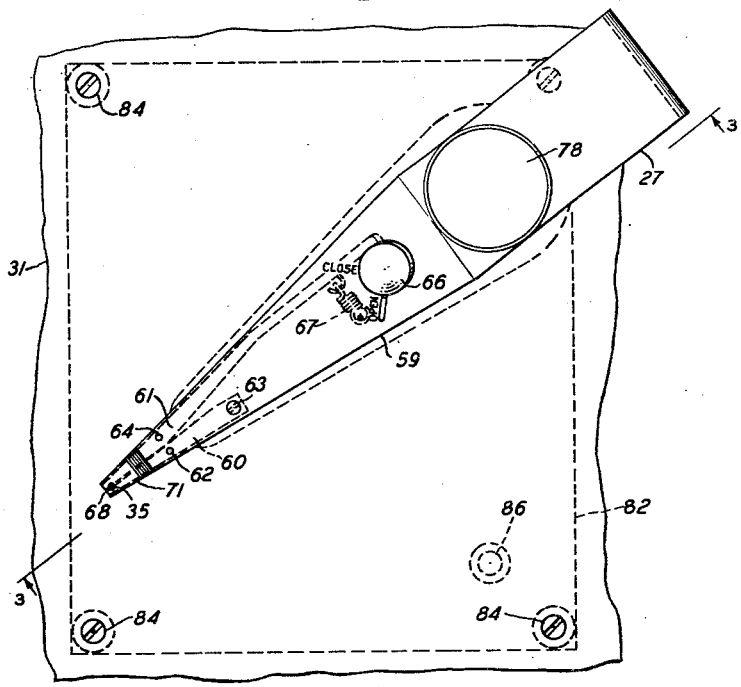
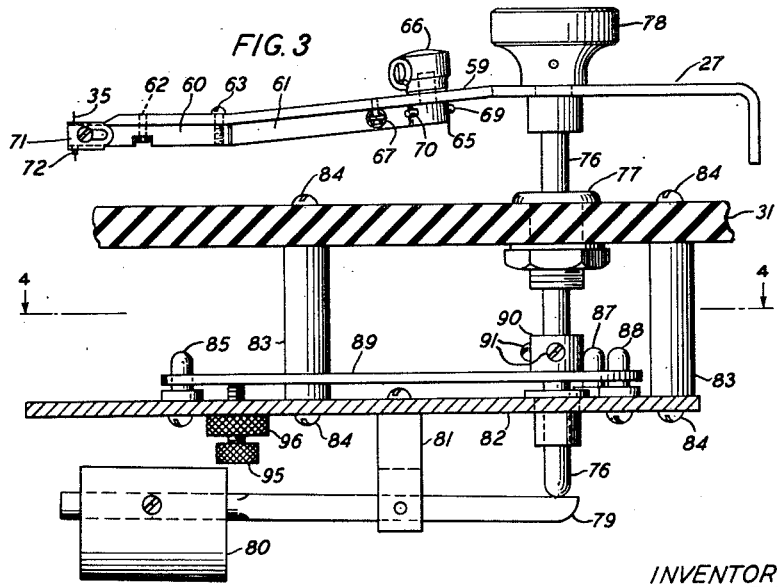
INVENTOR
W. E. INGERSON
BY J. MacDonald
ATTORNEY Jan. 19, 1943.  W. E. INGERSON  2,308,606
METHOD OF MAKING SOLDER CONNECTIONS
Filed May 8, 1941  7 Sheets-Sheet 3
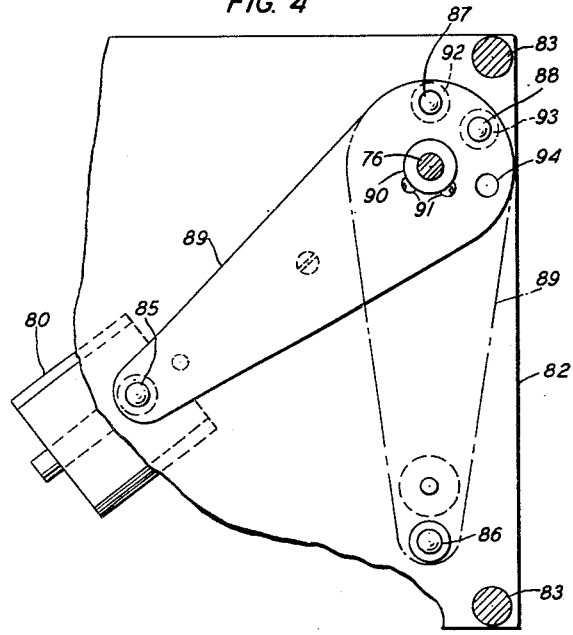
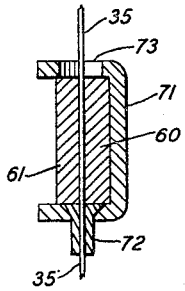
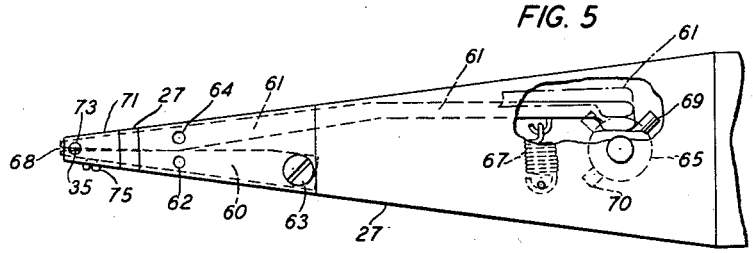
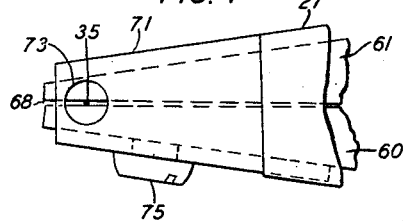
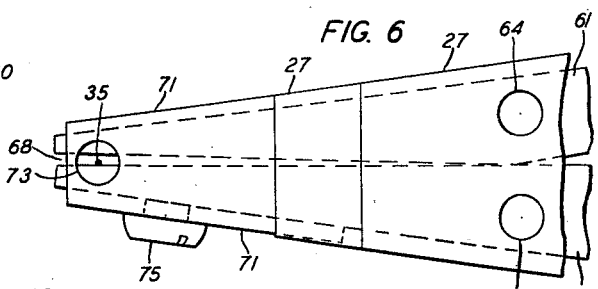
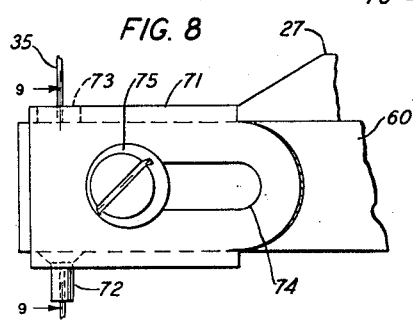
INVENTOR
W. E. INGERSON
BY J. MacDonald
ATTORNEY Jan. 19, 1943.                W. E. INGERSON                2,308,606
                    METHOD OF MAKING SOLDER CONNECTIONS
                    Filed May 8, 1941        7 Sheets-Sheet 4
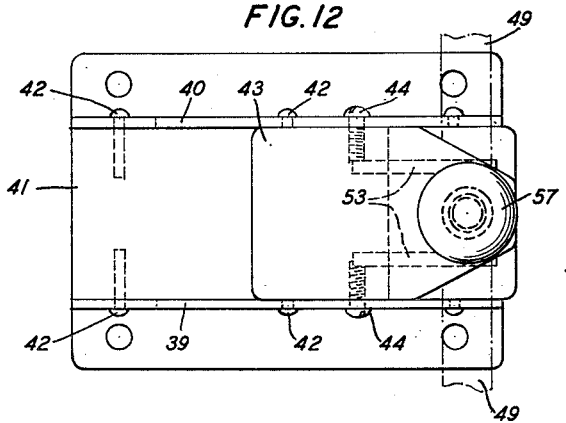
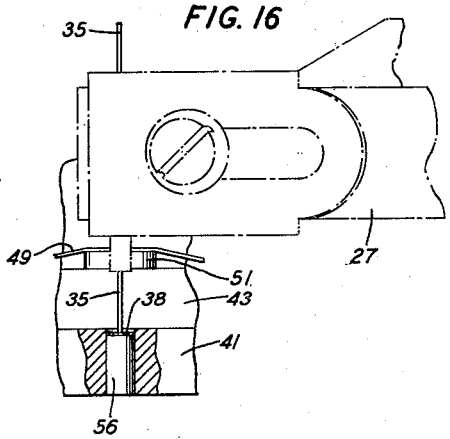
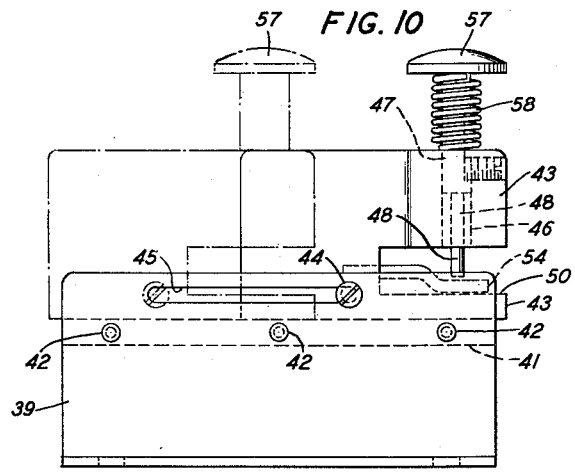
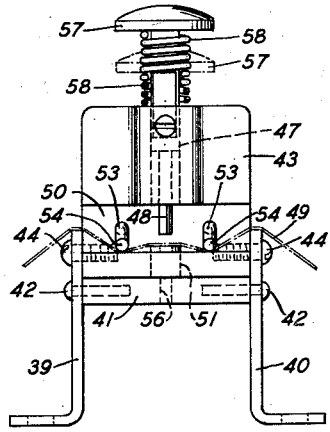
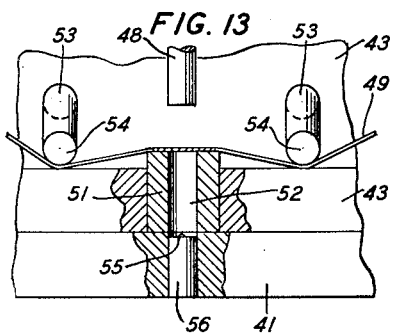
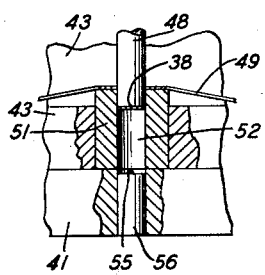
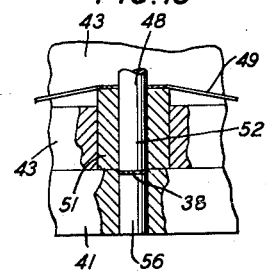
INVENTOR
W. E. INGERSON
BY J. MacDonald
ATTORNEY Jan. 19, 1943.  W. E. INGERSON  2,308,606
METHOD OF MAKING SOLDER CONNECTIONS
Filed May 8, 1941  7 Sheets-Sheet 5
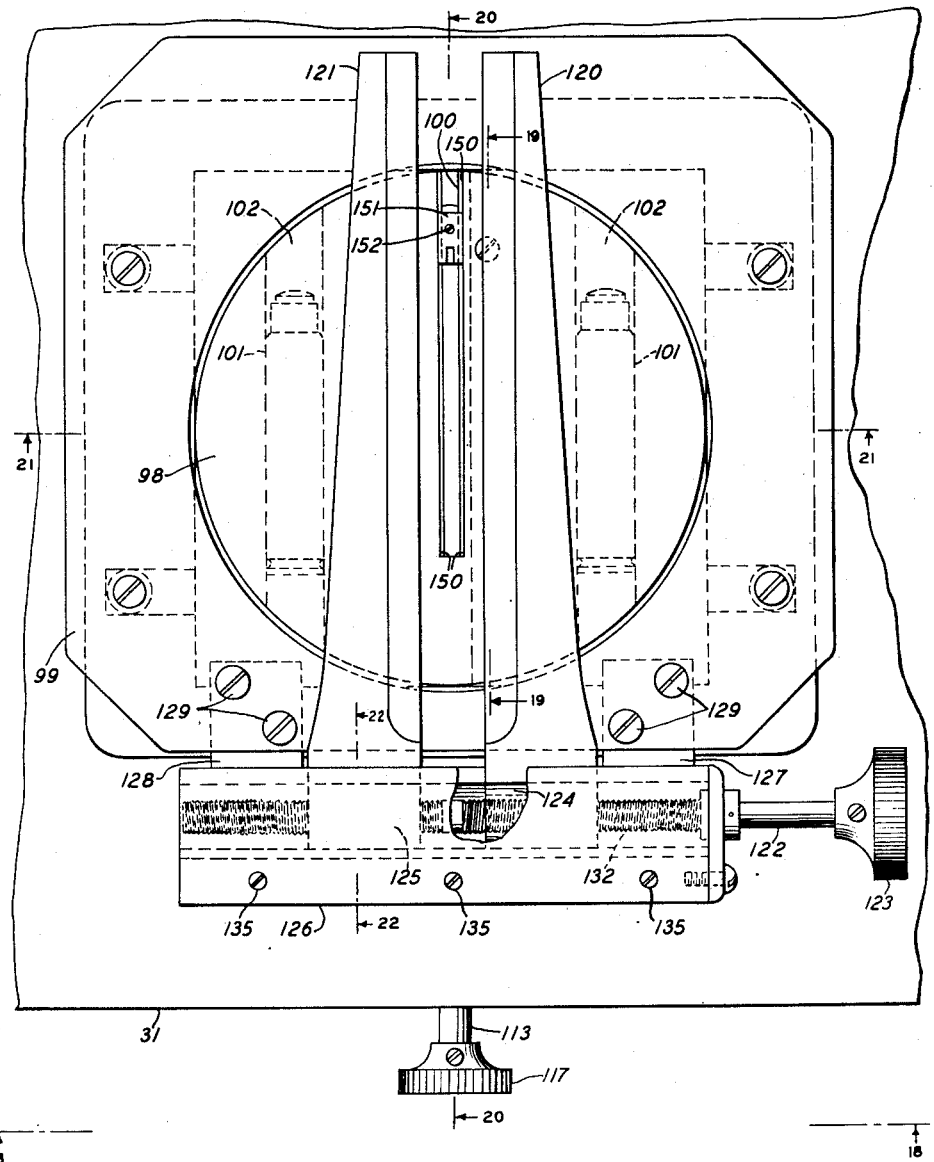
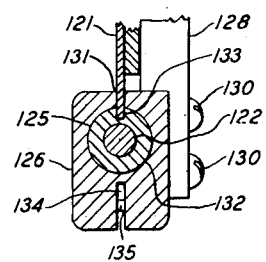
INVENTOR
W. E. INGERSON
BY J. MacDonald
ATTORNEY

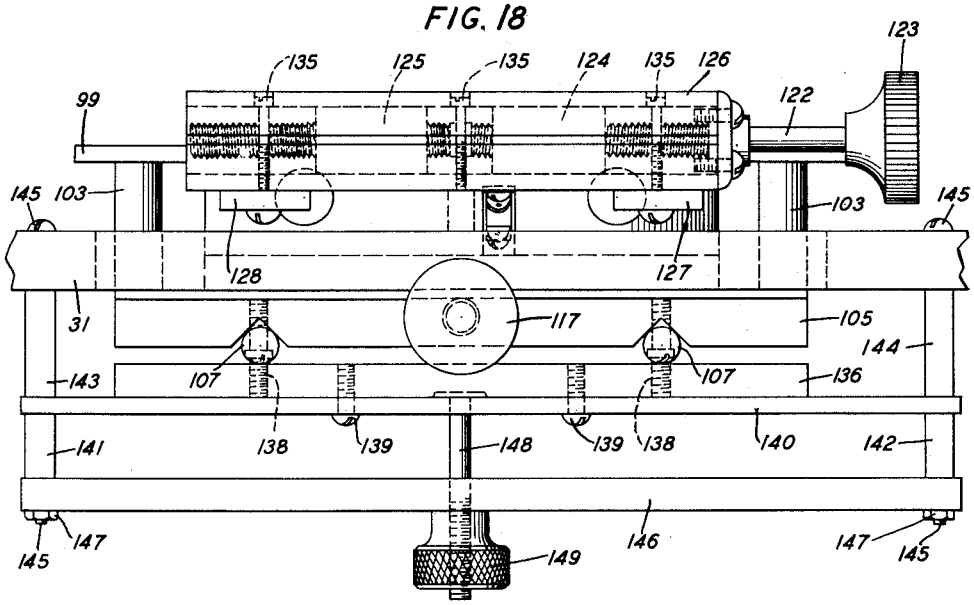

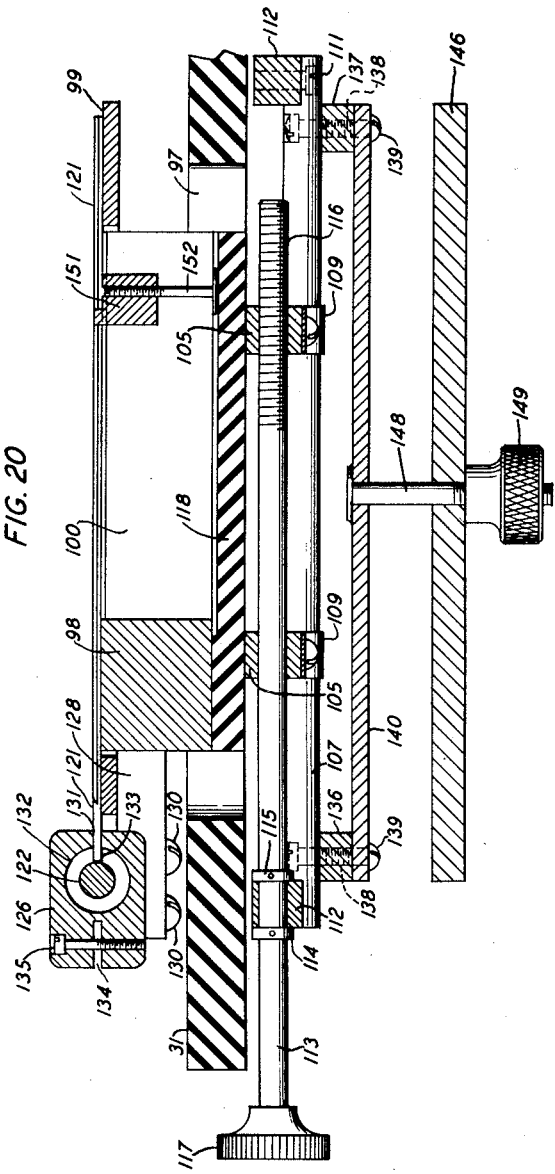

Patented Jan. 19, 1943

2,308,606

UNITED STATES PATENT OFFICE 2,308,606

METHOD OF MAKING SOLDER CONNECTIONS

William E. Ingerson, New York, N. Y., assignor to Bell Telephone Laboratories, Incorporated, New York, N. Y., a corporation of New York Application May 8, 1941, Serial No. 392,505

3 Claims. (Cl. 113—112)

This invention relates to a method of securing a wire to a metal surface.

The invention is applicable to the securing of wires of relatively fine gauge to metal surfaces formed on piezoelectric crystals.

In accordance with this invention a disc of solder of predetermined size and form is made. The disc is picked up by the end of the wire and is placed on a required point on a metal surface formed on a piezoelectric crystal. A heated tool is then placed in contact with the disc to make the disc form a solder connection between the wire and the metal surface on the crystal.

In the drawings:

Fig. 1 is a view in perspective of the apparatus devised for making the solder connections, the apparatus parts being mounted on a support in a convenient arrangement for use;

Fig. 2 is an enlarged top view of a wire holding chuck and a portion of the support shown in Fig. 1;

Fig. 3 is a side view, partly in section, of the chuck shown in Fig. 2;

Fig. 4 is a top view of a portion of the apparatus shown in Fig. 3 and taken on the line 4—4;

Fig. 5 is a top view of a portion of the chuck and showing the jaws thereof;

Fig. 6 is an enlarged view of an end portion of Fig. 5;

Fig. 7 shows an end portion of Fig. 6 but with the jaws in a closed condition;

Fig. 8 is a side view of Fig. 7;

Fig. 9 is an end view, in section, of Fig. 8 and taken on the line 9—9;

Fig. 10 is a side elevational view of a punch device used in making the discs of solder and shows two positions of a movable punch head;

Fig. 11 is an end view of the device shown in Fig. 10 and shows two positions of the plunger;

Fig. 12 is a top view of the punch device;

Figs. 13, 14 and 15 are enlarged views, partly in section, of portions of the punch device with a piece of sheet solder therein and showing three positions taken by the plunger;

Fig. 16 is an enlarged side view, partly in section, of a portion of the chuck, a portion of the punch device and with a wire held in the chuck and inserted in the punch device;

Fig. 17 is a top view of a hot plate device equipped with means for adjusting and holding a crystal in required position;

Fig. 18 is a front elevational view of the device shown in Fig. 17 and taken on the line 18—18;

Fig. 19 is a view, partly in section, taken on the line 19—19 in Fig. 17 and shows a thermostat provided in the hot plate device;

Fig. 20 is a side view, in section, of the hot plate device and taken on the line 20—20 in Fig. 17;

Fig. 21 is a front view, in section, of the hot plate device and is taken on the line 21—21 of Fig. 17;

Fig. 22 is a view, in section, of a portion of the hot plate taken on the line 22—22 in Fig. 17;

Fig. 23 shows a fragmentary portion of the chuck with a wire held therein and a disc of solder picked up by the end of the wire;

Fig. 24 shows a portion of a crystal with the wire solder-connected thereto; and Fig. 25 is a top view of the parts shown in Fig. 24.

The punch device is covered in a divisional application of this case Serial No. 433,475, filed March 5, 1942, and the hot plate device and the heated tool used in cooperation therewith in making the solder connection are covered in a divisional application of this case Serial No. 434,521, filed March 13, 1942.

In solder-connecting a wire of relatively fine gauge to a metal surface provided on a piezoelectric crystal, it is important that the wire be connected at the particularly desired point on the crystal; also that the solder connection made is of a predetermined size and form and is sufficiently strong to permit use of the wire as a supporting means for the crystal. It is also important that the wire be not sufficiently affected by the heat applied in making the solder connection as to cause embrittlement or annealing of the wire and that the crystal be not subjected to reactive forces or thermal gradient sufficient to cause fracturing of the crystal.

The apparatus shown in the drawings is constructed and arranged to make solder connections in accordance with the invention and as shown in Fig. 1 comprises a punch device 26, a chuck 27, a hot plate device 28, a heated tool 29 and a reel support 30, all of which are mounted on a suitable support 31. The hot plate device 28 is shown as supporting a crystal 32. The wire 35 is held in the chuck 27 so that the disc of solder on the end of the wire is in contact with the stripe 34 of metal on the crystal and the course of the heated tool 29 is shown by the dot-dash line 33.

In practicing the invention, a disc of solder of predetermined size and form is stamped out by means of the punch device 26. The crystal 32 with a metal stripe 34 thereon is placed on the hot plate device 28 and is adjusted on the hot plate device to a required position. An end portion of the wire 35 is threaded through jaws of the chuck 27 and so that a required length of the wire 35 projects below the jaws of the chuck. A suitable flux is applied to the downwardly projecting end portion of the wire and this end portion of the wire is then brought into contact with a predetermined point on the metal stripe 34 and so that some of the flux will be deposited on the metal stripe 34. The chuck 27 is then rotated to bring the downwardly projecting end of the wire 35 in register with an aperture provided in the punch device 26 containing the disc of solder. The end of the wire is thrust into the disc of solder so that the disc of solder will be frictionally held and centrally located on the end of the wire. The chuck is then rotated back to a position over the crystal 32 and the disc of solder is brought into engagement with the fluxed portion of the metal stripe 34. The heated tool 29 to which solder will not adhere is then rotated to bring its hot point 36 into contact with the disc of solder. The heat from the tool 29 melts the disc of solder so that the disc of solder will form a solder connection between the end of the wire 35 and the metal stripe 34. Since the end of the wire 35 was previously treated with a suitable flux, the molten material obtained by heating the disc of solder will have a tendency to flow upwardly along the wire 35 and will solidify on the end of the wire 35 in the form of a cone 37 when the heat is removed. The cone-shaped solder connection 37 obtained is shown in Fig. 24. Fig. 23 shows the disc 38 of solder on the end of the wire 35 before the disc is melted to obtain the solder connection 37. The hot plate device 28 is equipped with heating means and is maintained at a temperature slightly below the melting point of the solder disc 38 so that the crystal 32 will be maintained at an elevated temperature during the making of the solder connection. This prevents fracturing of the crystal 32 when the solder connection is being made. Maintaining the crystals at the elevated temperature reduces the reactionary effects upon application of the heated tool 36 to the crystal 32. After the solder connection is made the wire 35 may be severed at a predetermined point to leave a portion of the wire solder-connected to the crystal as shown in Fig. 24. A suitable supply of the wire 35 is contained on the spool 38 which is rotatably mounted on the reel support 30.

*Punch device*

The punch device 26, Fig. 10, may be used in making the disc 38 of solder. It comprises a pair of spaced upright supports 39 and 40, a horizontal plate 41 supported between the plates 39 and 40 by means of the screws 42, and a reciprocating punch-head 43 slidably supported on the horizontal plate 41. The punch-head 43 may be manually slid along the plate 41 to required positions and is held against dislodgment from the plate 41 by means of screws 44 which extend through elongated apertures 45 in the plates 39 and 40. Two extreme positions taken by the punch-head 43 are shown in Fig. 10, the full line position being the position taken by the punch-head 43 when the punch device is used in punching out a disc 38. The punch-head 43 is apertured at 46 to accommodate a plunger device 47 on the lower end of which is supported a punch 48, the punch 48 being adapted to punch out a disc 38 of predetermined size and form from a sheet 49 of solder foil. The punch-head 43 may be made in the form of a block and is transversely slotted at one end to provide an operating space 50 in which the strip 49 may be fed under the punch 48. A die 51 is supported in the punch-head 43 directly below and in register with the punch 48, the die 51 having an aperture 52 provided therein to slidably receive the punch 48 so that the die 51 and the punch 48 may be used in cooperation to punch out the discs 38 from the strip 49 of solder. The upper end of the die 51 extends upwardly within the space 50 so that a portion of the sheet 49 must be slightly elevated to pass over the upper portion of the die 51 as shown in Figs. 11, 13, 14 and 15. Two guide pins 53 are mounted in the punch-head 43 and extend into the operating space 50, the guide pins 53 being mounted in spaced relation and having downwardly extending ends 54 extending below the upper level of the die 51. The horizontal plate 41 is apertured at 55 directly below the lower end of the die 51, the aperture at 55 being of such form and dimensions that it will accommodate the disc 38 stamped out from the sheet 49. A plug 56 is provided in the aperture 55 and the upper end of the plug 56 is spaced below the upper surface of the plate 41 a sufficient distance to accommodate the thickness of the disc 38. As shown in Fig. 10, the punch-head 43 may be manually slid along the plate 41 from the dot-dash line position to the full line position shown in this figure, the extent of travel being limited by the screw 44 operating in the slot 45. When the punch-head 43 is in the full line position the punch 48 and the die 51 are directly over and in register with the aperture 55 provided in the plate 41. In this position the plunger 47 may be manually operated to press the punch 48 through the sheet 49 and the die 51 to punch out a disc 38 from the sheet 49, the disc 38 being deposited in the aperture 55 and resting on the top of the plug 56 in the horizontal plate 41. After the disc 38 has been punched out and pressure is released from the knob 57 provided on the top of the plunger 47 and the plunger 47 has been returned to its elevated position by means of the spring 58, the punch-head 43 may be slid along the plate 41 to the dot-dash line position shown in Fig. 10. Fig. 13 shows the punch 48 in its elevated position; Fig. 14 the punch 48 thrust through the sheet 49 and carrying the disc 38 downwardly within the die 51. Fig. 15 shows the disc 38 deposited on top of the plug 56 where it will remain during the sliding back of the punch-head 43 and until it is picked up on the end of the wire 35 shown in Fig. 1 and Fig. 23. It will be seen by looking at Figs. 11 and 13 that the sheet material 49 passes over the upper edges of 39 and 40 and under the portions 54 of the pins 53 and then over the upper end of the die 51 and that by reason of the frictional engagement of the sheet material 49 with the other parts mentioned the sheet material 49 is held in sufficient tension across the upper end of the die 51 to permit punching out of the disc 38 by means of punch 48. After a disc 38 has been punched out from the sheet material 49 the sheet material 49 may be moved across the upper end of the die 51 to obtain a new area for punching out another disc 38. When a disc 38 has been punched out from the sheet material 49 and is resting on the plug 56 and the punch-head 43 is moved to the dot-dash line position shown in Fig. 10, the disc 38 may be picked up by an end of the wire 35 held in the chuck 27, as shown in Fig. 16, by bringing the end of the chuck 27 holding the wire 35 over the disc 38 and then by pressing downwardly on the free end of the chuck 27 to thrust the wire 35 into the disc 38.

Chuck

The chuck 27 as shown in Figs. 1, 2 and 3 is constructed and arranged to hold an end of the wire 35 in a plurality of required positions and comprises an arm 59 equipped with jaws 60 and 61 arranged and supported on the undersurface of the arm 59, the jaw 60 being fixedly supported in position by means of a pin 62 and a screw 63. The jaw 61 is pivotally supported on a pin 64 mounted on the undersurface of the arm 59 and is movable relative to the jaw 60. The jaw 61 is much longer than the jaw 60 and is operated by means of a manually operated cam 65 equipped with a turning knob 66. When the cam 65 is rotated to bring a high spot thereon against the rear portion of the jaw 61 the jaw 61 is moved against the action of a spring 67 to bring the gripping ends 68 of the jaws together so that the wire 35 may be clamped therebetween. Rotation of the cam 65 to another position will permit the spring 67 to open the gripping ends of the jaws. Spaced pins 69 and 70 are provided on the cam 65 to limit rotation of the cam 65 to open and closed positions. A tapered bracket 71 partially encloses the operating ends of the jaws 60 and 61, the bracket 71 as shown in Fig. 9 having portions extending across the upper and lower surfaces of the jaws 60 and 61 and a portion extending down the side of the jaw 60. The lower portion of the bracket 71 is apertured to accommodate and hold an apertured tip 72 which is made of material to which solder will not adhere, the tip 72 being longitudinally bored to receive the wire 35 and the upper portion of the tip being formed to fit into a countersunk aperture in the bracket 71. The upper portion of the bracket is apertured at 73 to accommodate the wire 35. The bracket 71 is provided with an elongated slot 74 and is adjustably supported on the side of the jaw 60 by means of a screw 75 which extends through the aperture 74 and into the jaw 60. The bracket 71 may be adjusted on the jaw 60 so that the tip 72 and the wire 35 extending therethrough may be brought to a required point on the crystal 32 or over the aperture 55 in the punch device 26 when the chuck 27 is moved into position over the punch device 26 or the hot plate device 28. The arm 59 is mounted on a shaft 76 which is supported for rotational and longitudinal movement in a bearing 77 secured in the support 31, the shaft 76 being equipped with a knob 78 by means of which the shaft 76 may be lifted in the bearing 77 and rotated therein. The lower end of the shaft 76 is engaged by a lever 79 equipped with an adjustable counterweight 80 and is fulcrumed in a bracket 81 which is supported on the undersurface of a plate 82 secured to spaced pillars 83 extending from the lower surface of the support 31, the pillars 83 being held in place by screws 84. Spaced pins 85, 86, 87 and 88 are mounted on the upper surface of the plate 82. A positioning plate 89 equipped with an apertured boss 90 is mounted by means of the set screws 91 on the shaft 76, the plate 89 being apertured to receive the studs 85, 86, 87 and 88 and providing a means for holding the arm 59 in required positions over the punch device 26 or the hot-plate device 28. When the arm 59 is swung over to a position over the punch device 26 the stud 85 is engaged in an aperture provided in the free end of the positioning arm 89 and the studs 87 and 88 are engaged in apertures 92 and 93, respectively, in the other end of the positioning arm 89. This will hold the jaws of the chuck 27 in required position over the punch device 26. The chuck 27 may be rotated so that the jaws will be moved from this position and to a position over the hot-plate device 28 by lifting up on the knob 78 so that the arm 89 is brought out of engagement with the studs 85, 87 and 88. The chuck may then be rotated to bring it over the hot-plate device 28 and so that the aperture in the free end of the arm 89 will be engaged by the stud 86 and the apertures 93 and 94 provided in the arm 89 will be engaged by the studs 87 and 88, respectively. It will be seen that the counterweight 80 may be adjustably supported on the lever 79 so that its weight will almost counterbalance the weight of the chuck 27. This will relieve the wire 35 from most of the weight of the chuck 27. An adjustment screw 95 and a lock nut 96 are mounted on the plate 82 to engage the positioning plate 89 and prevent undue lowering of the chuck 27 when the chuck 27 is positioned over the punch device 26. Another adjustment screw 95 equipped with a lock nut 96 is also provided at a required point to prevent undue lowering of the chuck 27 when it is in position over the hot-plate device 28.

Hot-plate device

The hot-plate device 28 is used to support the crystal 32 while an end of the wire 35 is being solder-connected to a metallized surface 34 on the crystal 32 and is provided with adjustable positioning means to move the crystal to its desired position and hold it in that position while the solder connection is being made. As shown in Fig. 1, the hot-plate device 28 is positioned within a relatively large rectangular opening 97 provided in the support 31 and comprises a round table 98 and a rectangular frame plate 99, the upper surfaces of the table 98 and the plate 99 being in the same plane. An elongated aperture 100 is provided in the table 98 for a purpose to be later explained. As shown in Fig. 17, the table 98 is provided with cartridge type heating elements 101 which may be supplied with electrical current from a suitable source of supply, not shown, to heat the table 98 to a required temperature, the heating elements 101 being located in apertures 102 provided in the table 98. The frame plate 99 as shown in Figs. 1, 18 and 21 is supported on spaced posts 103 and is secured thereto by means of the screws 104. The posts 103 are supported on spaced slide bars 105 and are secured thereto by means of the screws 106. The slide bars 105 rest on spaced tracks 107 which are cylindrical in cross section, the slide bars 105 being transversely grooved on their lower surfaces as shown at 108 to accommodate the tracks 107. Leaf springs 109 secured by means of screws 110 to the undersurface of the slide bars 105 are provided to retain the slide bars 105 on the tracks 107, the springs 109 having curved end portions to frictionally engage the undersurfaces of the tracks 107. The tracks 107 are longer than the aperture 97 in the support 31 and are secured at their ends by means of screws 111 as shown in Fig. 20 to crosspieces 112. The bars 105 are apertured to accommodate an adjustment rod 113 which is journaled in one of the crossbars 112 and provided with retaining collars 114 and 115. The inner end of the rod 113 is externally threaded as shown at 116 and one at least of the bars 105 is internally threaded to receive the thread on the rod 113. The adjustment rod 113 is equipped with a manually operated knob 117 so that the adjustment rod 113 may be manually rotated. The table 98 may be made of aluminum or other good heat transmitting material and rests on an insulating plate 118 as shown in Fig. 21, which rests on the slide bars 105, the table 98 and the insulating plate 118 being secured in place by means of screws 119 which extend through apertures in the slide bars 105, through suitable apertures in the insulating plate 118 and into threaded engagement with the table 98. The table 98 and the frame plate 99 may be moved backward and forward within the aperture 97 by suitable rotation of the adjustment rod 113. It will therefore be apparent that if a crystal 32 is supported on the table 98, the table 98 and the frame plate 99 may be moved as a whole either backward or forward within the aperture 97 to bring the crystal or a predetermined point thereof into a desired position relative to an end of the chuck 27 when the chuck 27 is swung into overlying position relative to the hot-plate 28. The hot-plate 28 is also equipped with relatively long positioning fingers 120 and 121 to further adjust the crystal 32 to a required position and to hold the crystal in the position required. The fingers 120 and 121 are arranged in parallel spaced relation and extend across the upper surface of the table 98 and the frame plate 99 and may be moved toward or away from each other by operation of a manually rotatable adjustment screw 122 equipped with a turning knob 123. The screw 122 has right and left-hand thread portions engaging suitably threaded sleeves 124 and 125 which are slidably supported in a longitudinally apertured block 126. The block 126 is supported on flat bars 127 and 128 extending from the front edge of the frame plate 99 and which are secured to the undersurface of the plate 99 by means of the screws 129, the bars 127 and 128 being secured by means of the screws 130 to the undersurface of the block 126. A slideway 131 is provided in the rear wall of the block 126 to accommodate widened portions of the fingers 120 and 121, the slideway 131 being in communication with the longitudinal bore 132 provided in the block 126. When the knob 123 is rotated in one direction, the fingers 120 and 121 are moved toward each other by means of the threads on the shaft 122 and the sleeves 124 and 125, the widened ends of the fingers 120 and 121 being secured in suitable slots 133 provided in the sleeves 124 and 125 as shown in Fig. 22. Manual rotation of the knob 123 in the opposite direction will cause the fingers 120 and 121 to be moved away from each other. An elongated slot 134 is formed in the front portion of the block 126 and screws 135 are provided in the block to regulate the frictional engagement of the side walls of the aperture 131 on the portions of the fingers 120 and 121 extending therethrough, the screws 135 being extended transversely across the slot 134 and having screw-threaded engagement with the portion of the block 126 lying below the slot 134. When the screws 135 are tightened the portions of the block 126 lying above and below the slot 134 are drawn toward each other, It will be seen that since the slot 134 extends almost to the bore 132 in the block 126, tightening of the screws 135 will have the effect of slightly widening the aperture 131 and allow the fingers 120 and 121 to more freely slide in the aperture 131. The screws 135 may be used therefore to reduce or increase the frictional engagement of the walls defining the aperture 131 with the fingers 120 and 121 to a required extent. The tracks 107 are supported on spaced ties 136 and 137 and are secured thereto by means of the screws 138. The ties 136 and 137 are secured by means of screws 139 to a flexible plate 140 supported at its ends on pillars 141 and 142 and the plate 140 is held in spaced relation with the support 31 by means of the pillars 143 and 144. The pillars 141, 142, 143 and 144 are longitudinally bored and are held in place by long bolts 145 which also pass through the support 31, the pillars, the flexible plate 140 and a rigid plate 146. It will be seen by looking at Fig. 18 that the rigid plate 146 is suspended from the support 31 by means of the long bolts 145 which are equipped with nuts 147 to hold the parts in assembled condition. A bolt 148 is secured in about the central portion of the flexible plate 140 and extends downwardly through the rigid plate 146 and is equipped with a relatively large knurled nut 149 to provide means for adjusting the table 98 and the frame plate 99 upward and downward relative to the support 31. Turning of the nut 149 in a clockwise direction will cause downward flexing of the flexible plate 140 and consequent slight lowering of the table 98 and the frame plate 99. When the nut 149 is turned in a counterclockwise direction the flexible plate 140 will resume its normal position and slightly elevate the table 98 and the frame plate 99. The slot 100 provided in the table 98, as shown in Fig. 17, extends more than half the distance across the table 98 and through the entire thickness of the table. The upper edges of the walls defining the elongated aperture 100 are cut back to provide shoulders 150 to serve as a rest for a positioning block 151 through which a holding screw 152 extends. The lower end of the screw 152 as shown in Fig. 21 is provided with a large flat head 153 which extends in overlapping relation with the edges of the aperture 100 and into a slot 154 provided in the insulating plate 118. The upper end of the screw 152 is kerfed to permit turning of the screw within the block 151 which may be adjusted along the aperture 100 to provide a back stop for the crystal 32. The aperture 100 also provides a space in which wires already attached to a crystal may extend while a wire is being attached to the other side of the crystal. A thermostat 155 is provided to control the supply of current to the heating elements 101, the thermostat 155 being of the bi-metallic element type and being located in a suitable slot provided in the table 98. The thermostat 155 as shown in Fig. 19 may be adjusted by means of the screw 156 so that its contacts will open and close at required temperatures.

*Heated tool*

The heated tool 29, as shown in Fig. 1, somewhat resembles an electric soldering iron. The hot point 36 of the tool, however, is made of aluminum or some other heat transmitting material to which solder will not adhere. The tool is held in a clamp 157 which is pivotally supported in a yoke 158, the yoke 158 being pivotally supported on a post 159 provided with a base 160 which is secured by means of screws 161 to the support 31. A heating element in the tool may be supplied with current through a conductor core 162 which may extend from a suitable source of current supply, not shown.

In solder-connecting a wire to the crystal 32 a suitable metal surface is first provided on the crystal 32. This metal surface may be in the form of a stripe of solder applied across one of the flat surfaces of the crystal and at a nodal point of the crystal or at any other point required. A disc of solder of predetermined size and form is punched out from a sheet 49 of solder foil by means of the punch device 26, the punch-head 43 being moved over into a position in which the punch 48 may be thrust through the sheet 49 and moved to deposit the disc 38 in the holding space 55. The punch-head 43 is then moved along the plate 41 so that it no longer covers the disc 38, the punch-head being moved to the dot-dash line position shown in Fig. 10. An end of the wire 35 is led through the jaws of the chuck 27 and through the tip 72 so that a predetermined length of the wire 35 extends below the tip 72. The jaws of the chuck are then closed by operation of the knob 66 to hold the downwardly projecting end of the wire in required position. A suitable soldering flux is then applied to the end of the wire. The crystal 32 is adjusted on the hot-plate device 28 to a required position by means of the fingers 120 and 121 which may be brought toward each other to engage opposite sides of the crystal 32 by operation of the knob 123. The hot-plate device 28 may be then moved as a whole by operation of the knob 117 to move the hot-plate device 28 forward or backward as required to bring a particular point on the stripe 34 on the crystal directly under the end of the wire when the chuck 27 is in the position shown in Fig. 1. The crystal 32 may be also adjusted on the table 98 by moving the stop 151 to a required position. Further relative adjustment of the parts to be connected may also be made by moving the bracket 71 holding the tip 72 through which the wire extends. When all the parts have been set so that the downwardly projecting end of the wire 35 is directly over the required point on the stripe 34, the chuck 27 is moved downwardly so that the fluxed end of the wire 35 comes into contact with the stripe 34 and so that some of the flux from the wire will be deposited on the stripe 34. The chuck 27 is next rotated by manual turning of the knob 78 to bring the downwardly projecting end of the wire 35 directly over the aperture 55 in the punch device 26. The chuck is then lowered so that the end of the wire slightly pierces the disc 38 of solder held in the punch device 26, the extent of lowering of the chuck 27 being limited by a screw 163 adjustably mounted on the support 31. Chuck 27 is then lifted so that the disc 38 will be lifted from the punch device 26 and carried by the end of the wire out of the punch device 26. The chuck 27 is then rotated to the position shown in Fig. 1 and is lowered again so that the disc 38 comes into contact with the fluxed portion of the stripe 34 on the crystal 32. It is to be understood that during these operations the hot-plate device 28 is maintained at a required temperature and that the crystal 32 resting thereon is heated to a temperature slightly below the melting temperature of the solder disc 38 and below the melting temperature of the material in the stripe 34. When the disc 38 is placed on the stripe 34 the heated tool 29 is swung from the position shown in Fig. 1 and over the course indicated by the dot-dash line 33 and the point 36 of the heated tool 29 is brought into engagement with a portion of the disc 38, the tip 36 of the tool 29 being maintained at a sufficiently high temperature to melt the disc 38 of solder. When the disc 38 melts, the molten material from the disc 38 will form a solder connection of conical form 37 between the end of the wire and the stripe 34 on the crystal 32. Some of the molten material will flow up the lower end of the wire 35 and some of it will slightly spread out over the stripe 34 on the crystal. When the heated tool 29 is removed from engagement with the disc 38, the solder will solidify and provide the solder connection 37 shown in Fig. 24. It will be seen that since the disc 38 is made of predetermined size and form and that because the heating tool 29 is only applied for a sufficient length of time to bring the material in the disc 38 to a molten condition and is then removed, substantially none of the material in the disc 38 will be lost. Furthermore, since the end of the wire is wetted by the flux and the solder therefore has a tendency to follow the flux on the wire, a solder connection of conical form is made between the wire and the metal stripe on the crystal and the crystal is not overloaded by the application of too much solder at the point of connection between the wire 35 and the metal stripe 34. After the wire 35 has been solder-connected to the crystal on one side, the wire 35 may be severed at a required point, the crystal may be then turned over on the table 98 with the projecting end of the wire remaining no the crystal extending downwardly within the aperture 100 and the apparatus may be operated again to solder-connect an end of the wire 35 to a metal stripe 34 provided on the other side of the crystal. I have found that when solder connections are made with the apparatus shown and described, the solder connections are all of the same size and form and are all located at the required point on the crystal. The wire 35 is not embrittled or annealed by the heat used in making the solder connection since no electrical heating current is applied through the wire 35 such as might change the characteristic of the wire 35 and, in fact, there is no heat directly applied to the wire 35 because the heated end 36 of the heated tool 29 is not brought into engagement with the wire 35 but is only brought into engagement with the disc 38 of solder. Since the characteristic of the wire 35 is not changed in any way in making the solder connection, the wire 35 retains its original resiliency and may be used as a resilient support for the crystal 32 as well as a conductor wire for supplying current to the crystal.

What is claimed is:

1. The method of securing a wire to a crystal comprising cutting a disc of solder of predetermined size and form, providing on the crystal at a required point a surface of solder, applying flux to an end of the wire and to the surface of solder, thrusting the fluxed end of the wire into the disc of solder to make the disc stick on the end of the wire, placing the disc with the wire frictionally attached thereto on the fluxed portion of the solder on the crystal, applying a heated tool having no affinity for the solder to the disc of solder to make the solder form a solder connection between the wire and the crystal and removing the heated tool as soon as the material in the solder disc is brought to a molten condition.

2. The method of securing a wire to a crystal comprising cutting a disc of solder of predetermined size and form, providing a surface of solder on the crystal at a required point, applying a soldering flux to an end of the wire and bringing the fluxed end of the wire into engagement with the surface of solder on the crystal and depositing some of the flux from the wire on the surface of solder on the crystal, thrusting the fluxed end of the wire into the disc of solder to make the disc frictionally stick on the end of the wire, heating the crystal to a predetermined temperature below the melting temperature of the disc of solder and the surface of solder on the crystal, placing the disc with the wire attached thereto on the fluxed portion of the solder surface on the crystal, applying a heated tool to the disc of solder until the disc is brought to a molten condition and then removing the heated tool from the disc of solder.

3. The method of securing a wire to a crystal comprising cutting a disc of solder of predetermined size and form from a sheet of solder foil, providing a surface of solder on a required point on the crystal, applying flux to an end of the wire and to the surface of solder on the crystal, thrusting the fluxed end of the wire into the disc of solder and picking up the disc of solder on the end of the wire, placing the disc with the wire attached thereto on the fluxed portion of the solder on the crystal and applying a heated tool having a heated tip to which solder will not adhere to the disc of solder until the material in the disc of solder begins to melt and then removing the heated tool from the disc of solder.

WILLIAM E. INGERSON.